(12) United States Patent
Böhm

(10) Patent No.: US 6,246,664 B1
(45) Date of Patent: Jun. 12, 2001

(54) MODULATOR FOR MODULATING DIGITAL SIGNALS

(75) Inventor: Manfred Böhm, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/062,110

(22) Filed: Apr. 17, 1998

(30) Foreign Application Priority Data

Apr. 18, 1997 (DE) .............................. 197 16 323

(51) Int. Cl.[7] .................. H04J 3/04; H04J 3/02; H04L 27/28

(52) U.S. Cl. ............. 370/206; 370/535; 370/536; 370/537; 375/260

(58) Field of Search ............ 370/206, 212, 370/480, 482, 535, 536, 537, 485, 486, 487; 375/260, 132, 211, 214

(56) References Cited

U.S. PATENT DOCUMENTS

| | | | | |
|---|---|---|---|---|
| 3,733,438 | * | 5/1973 | Haley et al. | 370/482 |
| 5,251,053 | * | 10/1993 | Heidemann | 359/145 |
| 5,323,255 | | 6/1994 | Sierens et al. | 359/137 |
| 5,373,502 | | 12/1994 | Turban | 370/18 |
| 5,384,651 | | 1/1995 | Van de Voorde | 359/152 |
| 5,504,783 | * | 4/1996 | Tomisato et al. | 370/482 |
| 5,623,518 | * | 4/1997 | Pfiffner | 370/212 |
| 5,650,996 | * | 7/1997 | Bode et al. | 370/480 |
| 5,719,874 | | 2/1998 | Heidemann et al. | 370/535 |
| 5,771,224 | * | 6/1998 | Seki et al. | 370/482 |
| 5,802,153 | * | 9/1998 | Sridhar et al. | 370/465 |

FOREIGN PATENT DOCUMENTS

| | | |
|---|---|---|
| 2045144 | 3/1972 | (DE) . |
| 3621682 | 1/1988 | (DE) . |
| 3621680 | 4/1994 | (DE) . |
| 4441634 | 6/1996 | (DE) . |

OTHER PUBLICATIONS

"A Discrete Multitone Transceiver System for HDSL Applications", J. Chow et al, IEEE Journal on Selected Areas in Communications, vol. 9, No. 6, Aug. 1991, pp. 895–908.

"Multicarrier Modulation for Data Transmission: An Idea Whose Time Has Come", J. Bingham, *IEEE Communications Magazine*, May 1990, pp. 5–14.

U. Mlecek et al, "Der Fernmelde Ingenieur", Verlag fur Wissen–schaft und Leben Georg Heidecker GmbHm Erlangen, Germany, 1993, pp. 50–57.

* cited by examiner

Primary Examiner—Ajit Patel
Assistant Examiner—Hanh Nguyen (57) ABSTRACT

Digital signals are commonly transmitted using the single-carrier method or the multicarrier method, for example. Both methods use one carrier frequency per transmission channel or subchannel of predetermined bandwidth. According to the invention, at least two carrier frequencies (f1, f2, f3) are used to increase the transmission capacity of a channel. The distance between two carrier frequencies is less than the absolute value of a carrier frequency (f1, f2, f3) by a factor of, e.g., 500. The beat frequency resulting from the combination (ADD) of several carrier frequencies (f1, f2, f3) in a channel is negligible, particularly if the transmitted carrier frequencies (f1, f2, f3) are in phase at the start of oscillations. By the combination (ADD) of several carrier frequencies (f1, f2, f3), equal resulting carrier frequencies can be obtained for different bit streams (DATA1, DATA2, DATA3). A suitable distinguishing feature is, for example, the amplitude, the angle setting, or the assignment to additional carrier frequencies.

20 Claims, 7 Drawing Sheets

FIG. 1

FIG. 2a DATA 1

FIG. 2b DATA 2

Fig. 12

MODULATOR FOR MODULATING DIGITAL SIGNALS

BACKGROUND OF THE INVENTION

1. Technical Field

This invention relates to a modulator for modulating digital signals, and to a demodulator.

2. Discussion of Related Art

It is known, for example from the journal "Der Fernmeldeingenieur", 8 and 9/1993, Verlag für Wissenschaft und Leben Georg Heidecker GmbH, Erlangen, pages 51 to 56, to transmit digital signals by the single-carrier method or by the multicarrier method. Both methods use one carrier frequency per transmission channel or per subchannel of predetermined bandwidth to transmit digital signals. Quadrature amplitude modulation (QAM), for example, is applied to the digital signals, and the result is assigned to the carrier frequency of the respective transmission channel.

In an article entitled "Multicarrier Modulation for Data Transmission: An Idea Whose Time Has Come", IEEE Communications Magazine, May 1990, pages 5 to 14, the problems associated with the overlapping of spectra of a transmission channel of predetermined bandwidth and a neighboring transmission channel are considered. If the overlap of the spectra is such that their −3 dB frequencies lie one above the other, the spectra of the individual transmission channels can still be detected at the receiver end by means of suitable filters.

The transmission of digital signals is thus limited by the bandwidth of a transmission channel. The alignment of transmission channels or subchannels in terms of frequency is limited by the overlap of the spectra into neighboring channels.

It is therefore an object of the invention to increase the transmission capacity of digital signals without changing the bandwidth of a transmission channel.

SUMMARY OF INVENTION

According to the invention, this object is attained by a modulator characterized in that it is adapted to assign digital signals to be transmitted to several carrier frequencies in a transmission channel. For example, in the simplest case, a two-bit sequence is assigned to two carrier frequencies of a transmission channel in such a way that on the occurrence of the bit sequence 01, for example, the first carrier frequency is not transmitted and the second carrier frequency is transmitted, or that on the occurrence of the bit sequence 11, both carrier frequencies are transmitted. In contrast to the prior art, where only one carrier frequency is provided per transmission channel and where consequently, on the occurrence of a bit sequence 11, the carrier frequency would have to be transmitted twice in succession, in the present example, the transmission capacity is increased by the modulator according to the invention by a factor of 2.

If two closely spaced carrier frequencies are transmitted simultaneously, overlapping of the spectra and beating between the carrier frequencies takes place, which requires at the receiver end a demodulation different from the prior art.

According to the invention, therefore, the above object is also attained by a demodulator as claimed in claim 10. This demodulator is characterized in that there is provided at least one means adapted to detect at least three carrier frequencies to generate a bit combination in dependence on the result of the detection and on the number of possible carrier frequencies, and to combine several bit combinations generated successively in time into at least one bit stream.

BRIEF DESCRIPTION OF THE DRAWINGS

The invention will become more apparent from the following description of embodiments when taken in conjunction with the accompanying drawings, in which.

DETAILED DESCRIPTION OF PREFERRED EMBODIMENTS

Figure 1:
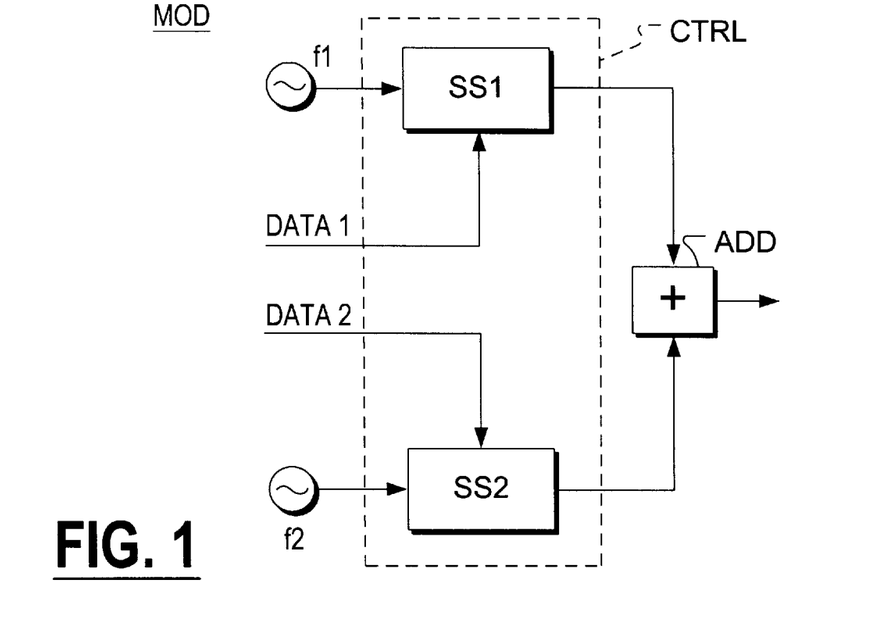
FIG. 1 is a schematic diagram of a first modulator according to the invention.

The first embodiment will be explained in the following with the aid of FIGS. 1 and 2. FIG. 1 shows a modulator MOD for modulating a digital signal which consists of two bit streams DATA1, DATA2 applied in parallel. The bit streams are generated by a serial-to-parallel converter (not shown), for example.

The modulator includes a control unit CTRL which is suited for assigning digital signals to be transmitted to two carrier frequencies f1, f2 in a transmission channel of predetermined bandwidth. The values of the frequencies are, for example, 1.000001 GHz and 1.000002 GHz. The bandwidth of the transmission channel is 100 kHz, for example.

To generate the two carrier frequencies, the modulator MOD includes two frequency generators. Also provided is an adding unit ADD by means of which two carrier frequencies can be combined.

The control unit CTRL contains two controllable means SS1, SS2 for transmitting the two carrier frequencies f1 and f2, which are inphase at the start of oscillations. The means SS1 is connected to the frequency generator for generating the carrier frequency f1 and to the adding unit ADD. The means SS2 is connected to the frequency generator for generating the carrier frequency f2 and to the adding unit ADD. The bit stream DATA1 is applied as a control signal to the means SS1, and the bit stream DATA2 to the means SS2.

Each of the means SS1, SS2 works on the start-stop principle. The means SS1 receives the carrier frequency f1 from its associated frequency generator, and transmits it to the adding unit ADD or prevents its onward transmission depending on the current bit value of the bit stream DATA1. If the bit stream DATA1 is at logic 0, the carrier frequency f1 will not be passed on. If the bit stream DATA1 is at logic 1, the carrier frequency f1 will be passed on, such that on a transition from logic 0 to logic 1, the carrier frequency f1 will be transmitted with a predetermined phase angle. If the carrier frequency f1 is a cosine function, for example, the predetermined phase angle will advantageously be fixed at zero degrees so as to permit fast demodulation on the demodulation side. With the one-to-zero transition, the transmission of the carrier frequency f1 is terminated. On the next transition to logic 1, the transmission of the carrier frequency f1 begins again with the predetermined phase angle. The same applies analogously for the means SS2.

Figure 2A:
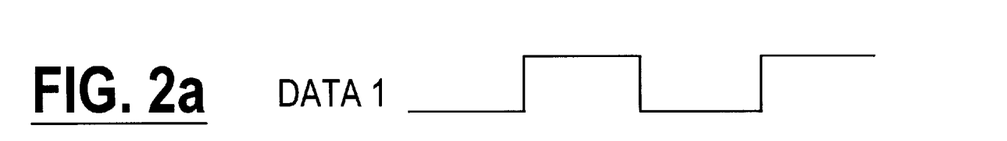
FIG. 2 shows three signal waveforms in the modulator of FIG. 1.
Figures 2B, 2C:
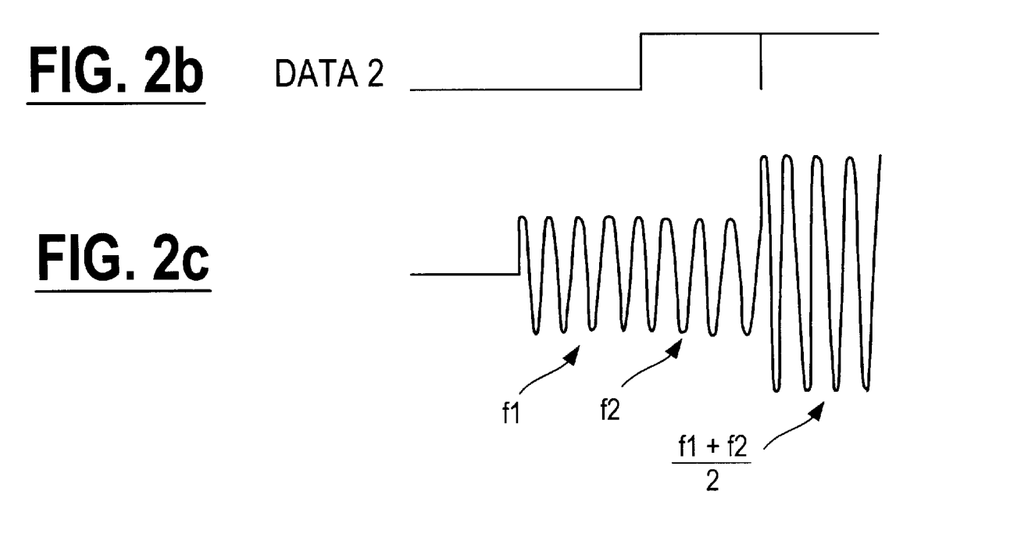

FIGS. 2(a) through 2(c) show three signal waveforms with a common timeline. The first waveform in FIG. 2(a), shows a part of the bit stream DATA1. The second waveform, in FIG. 2(b) shows a part of the bit stream DATA2. The third waveform, in FIG. 2(c), shows the shape of the output signal of the adding unit ADD, which results from the above parts of the bit streams DATA1 and DATA2. The signal waveforms are chosen to cover all possible bit combinations between the bit streams DATA1 and DATA2. From two binary signals, the bit combinations 00, 01, 10, and 11 can be formed. If both bit streams DATA1 and DATA2 are at logic 0, no carrier frequency will be transmitted and the output of the adding unit ADD will also be at logic 0. If the bit stream DATA1 is at logic 1 and the bit stream DATA2 at logic 0, the output of the adding unit ADD will contain the carrier frequency f1. If the bit stream DATA1 is at logic 0 and the bit stream DATA2 at logic 1, the output of the adding unit ADD will contain the carrier frequency f2. If both bit streams DATA1 and DATA2 are at logic 1, the output of the adding unit ADD will contain the sum of the carrier frequencies f1 and f2. The combination of the carrier frequencies results in a signal of double amplitude and in a carrier frequency (f1+f2)/2. The following example illustrates this:

F1=cos(f1×t), where F1=the signal generated by the frequency generator for generating the carrier frequency f1, and t=time, F2=cos(f2×t), where F2=the signal generated by the frequency generator for generating the carrier frequency f2, and t=time, F1+F2=2×cos(fT×t)×cos(fS×t), where fT=the resulting carrier frequency, and fS=the beat frequency;

fT is calculated by fT=(f1+f2)/2=1.0000015 GHz, and fS is calculated by fS=(f2−f1)/2=1 kHz.

fS and fT thus differ by a factor of 1000000. fS has an effect on the amplitude of the sum signal. If both signals begin with a phase angle of 0 degrees, however, the sum signal is at its maximum, at which the amplitude varies only little with time. In this initial range, therefore, the sum frequency fS has little effect on the amplitude, so that the amplitude remains nearly constant. The bit rate of the bit streams DATA1 and DATA2 is adapted to the carrier frequencies f1 and f2 in such a manner that the change in amplitude caused by the beat frequency fS is negligible. The bit rate of the bit streams DATA1 and DATA2 is 500 MHz, for example.

In the following, the second embodiment will be explained with the aid of FIG. 3 and FIGS. 4(a)–4(d) shows a modulator MOD for modulating digital signals which consist of two bit streams DATA1, DATA2 applied in parallel. The modulator MOD corresponds to the modulator of FIG. 1 except for an additional matching circuit consisting of an OR gate OR, an AND gate AND, an inverter INV, and for an additional amplitude limiter AMP, which can be used independently of the matching circuit.

Figure 3:
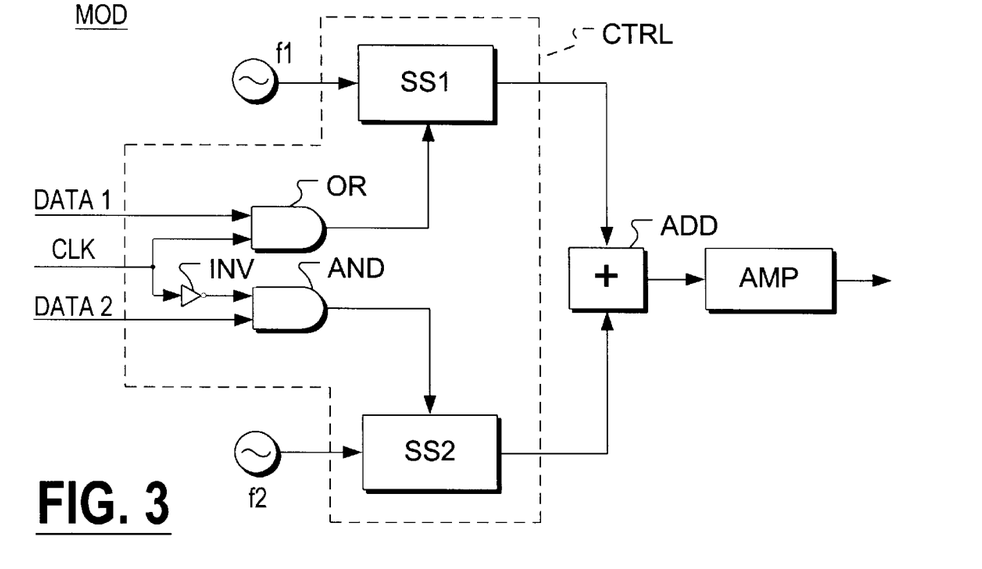
FIG. 3 is a schematic diagram of a second modulator according to the invention.

The matching circuit serves to combine the control of the means SS1 and SS2 with a clock signal CLK in order to achieve the transmission of a predetermined carrier frequency f1 in dependence on the clock signal. The clock signal is generated by a clock generator (not shown), for example, and is applied to one of the two inputs of the OR gate OR and to the input of the inverter INV. The frequency of the clock signal CLK is twice as high as the bit rate of the bit streams DATA1 and DATA2. It serves, for example, to insert between the combined, transmitted carrier frequencies at equal time intervals a synchronizing signal with which the demodulator or receiver at the receiving end can synchronize. In the simplest case, the synchronizing signal is the carrier frequency f1.

One input of the OR gate OR is presented with the bit stream DATA1, and the other input with the clock signal CLK. The output is connected to the control input of the means SS1.

One input of the AND gate AND is presented with the bit stream DATA2, and the other input with the output signal of the inverter INV. The output is connected to the control input of the means SS2.

When the clock signal is at logic 1, the OR operation ensures that the clock frequency f1 is passed on to the adding unit. At the same time it is ensured via the inverter INV and the AND operation that a logic 0 is presented to the means SS2, so that the transmission of the carrier frequency f2 is inhibited. When the clock signal CLK is at logic 0, one input of the OR gate OR is a logic 0 and one input of the AND gate AND is a logic 1, so that the control of the means SS1 and SS2 depends exclusively on the bit values of the bit streams DATA1 and DATA2, respectively. This is illustrated in FIG. 4.

Figure 4A:
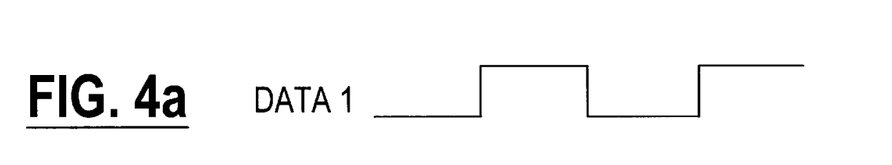
FIG. 4 shows four signal waveforms in the modulator of FIG. 3.
Figure 4B:
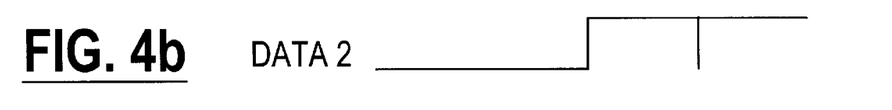
Figure 4C:
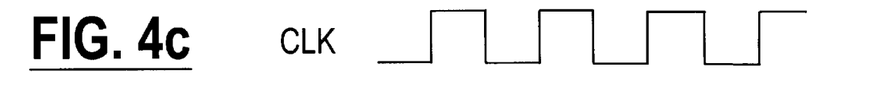

FIGS. 4(a) through 4(d) show four signal waveforms with a common timeline in the modulator of FIG. 3. The first waveform of FIG. 4(a) shows a part of the bit stream DATA1 with the bit sequence 0101. The second waveform of FIG. 4(b) shows a part of the bit stream DATA2 with the bit sequence 0011. The third waveform of FIG. 4(c) shows a part of the clock signal CLK with the bit sequence 01010101. The clock signal CLK is synchronous with the bit streams DATA1 and DATA2, which are also synchronous. The latter synchronism is achieved via a serial-to-parallel converter, for example. The serial-to-parallel converter operates at the pulse rate of the clock signal or at a clock rate derived therefrom, for example, so that the synchronism with the bit streams DATA1 and DATA2 can be adjusted.

Figure 4D:
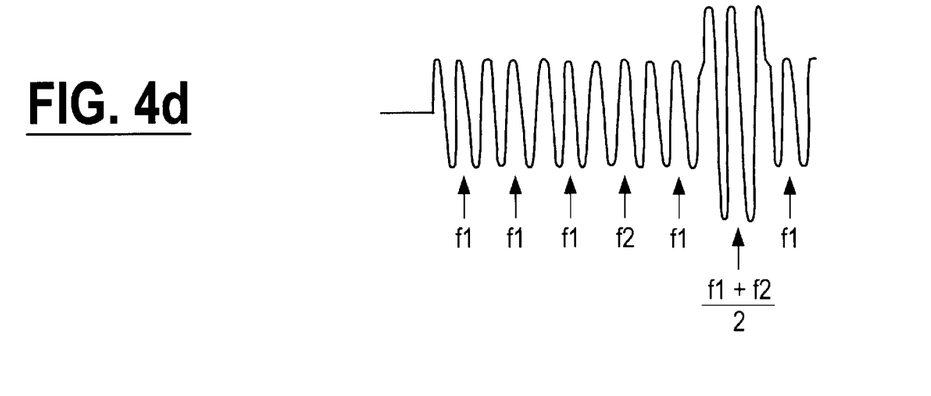

The fourth waveform of FIG. 4(d) shows the signal provided by the adding unit, which contains the carrier frequencies f1 and f2. When both the bit streams DATA1, DATA2 and the clock signal CLK are at ONE level, the sum signal at the output of the adding unit ADD is at ZERO level. When the clock signal CLK is at ONE level, the sum signal contains only the carrier frequency f1, but not the carrier frequency f2. When the clock signal is at ZERO level, the sum signal depends on the levels of the bit streams DATA1 and DATA2, similarly to the first embodiment. When both bit steams DATA1 and DATA2 are at ONE level, the sum signal has the resulting carrier frequency (f1+f2/2) and an amplitude of 2.

By the use of an amplitude limiter AMP coupled to the output of the adding unit ADD, the amplitude of the sum signal, particularly if both bit streams DATA1 and DATA2 are at ONE level, can be limited to a value of 1 so as to provide a uniform maximum amplitude for the entire sum signal. This makes it possible to set a signal-to-noise ratio which is optimally adapted to the transmission path. Demodulation is also possible without knowledge of the amplitude, since only the frequency of the received signal needs to be detected. If the detected frequency is f1, the bit combination is 01, with the 1 belonging to the bit stream DATA1, and the 0 to the bit stream DATA2. If the detected frequency is (f1+f2)/2, the bit combination is 11, with the first 1 belonging to the bit stream DATA2, and the second 1 to the bit stream DATA1.

Figure 5:
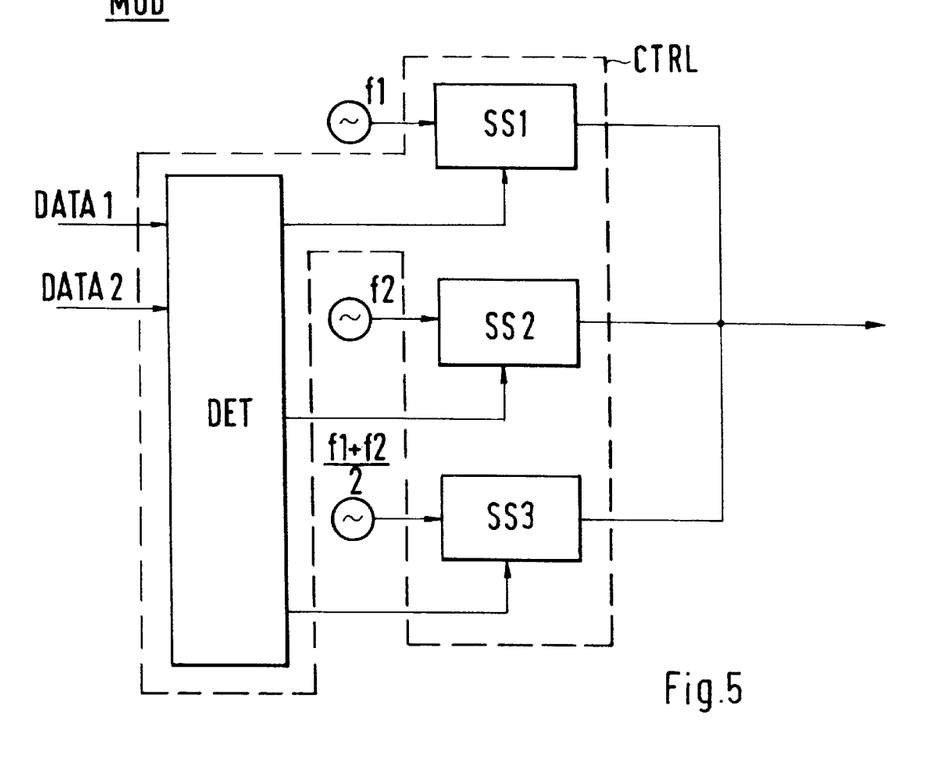
FIG. 5 is a schematic diagram of a third modulator according to the invention.

In the following, the third embodiment will be explained with the aid of FIGS. 5 and 6. FIG. 5 shows a modulator MOD for modulating digital signals which consist of two bit streams DATA1 and DATA2 applied in parallel. The modulator MOD corresponds to the modulator of FIG. 1 except for an additional detection unit DET, an additional frequency generator for generating the carrier frequency (f1+f2)/2, and an additional means SS3, which is identical in construction to the means SS1. Unlike the modulators of FIGS. 1 and 3, the modulator MOD of FIG. 5 does not require an adding unit and an amplitude limiter.

The detection unit DET serves to detect the binary values of the bit streams DATA1 and DATA2 and combines them into control signals for the means SS1, SS2, and SS3. If the binary value of the bit stream DATA1 is 1 and the binary value of the bit stream DATA2 is simultaneously 0, a 1-state control signal will be applied to the means SS1 and a 0-state control signal or no control signal will be applied to the means SS2, so that only the carrier frequency f1 will be transmitted. If the binary values of both bit streams are 1, a 1-state control signal will be sent to the means SS3, so that the carrier frequency (f1+f2)/2 will be transmitted.

This gives signal waveforms comparable to those of FIG. 2(c) but of constant amplitude. The modulator MOD of FIG. 5 may also be provided with a matching circuit similar to that of FIG. 3, so that signal waveforms are obtained which correspond to those of FIG. 2(c) except that the amplitude is constant. The output of the modulator MOD of FIG. 5 may be coupled to an amplifier in order to adapt the amplitude of the output signal to the transmission characteristics of the transmission path. If different frequency-dependent losses occur on the transmission path, amplifiers with different gains, for example, may be provided at the outputs of the means SS1, SS2, and SS3.

Figure 6:
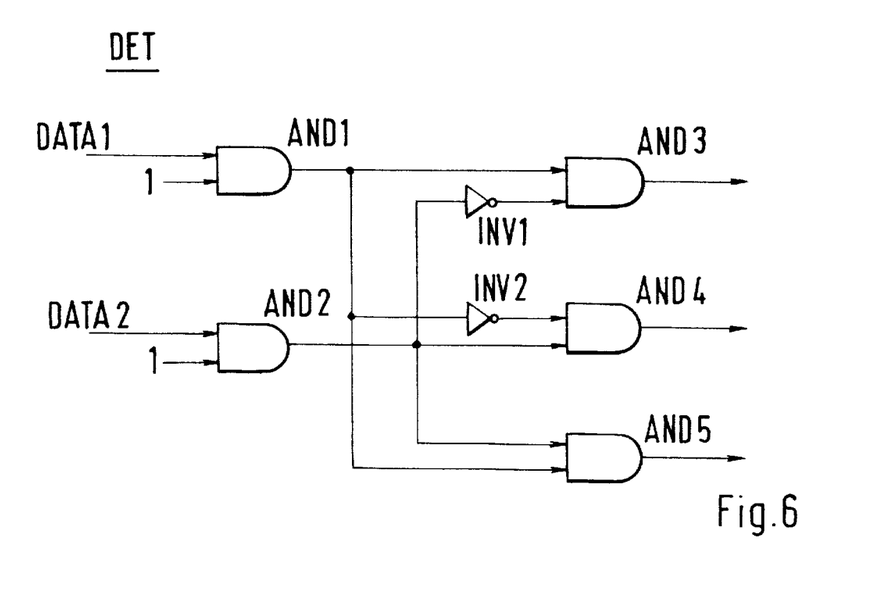
FIG. 6 is a schematic diagram of one embodiment of the detection unit of the modulator of FIG. 5.

FIG. 6 shows one embodiment of the detection unit DET of the modulator of FIG. 5 in a schematic diagram. The detection unit DET contains five AND gates AND1, AND2, AND3, AND4, AND5 and two inverters INV1, INV2, which are connected together. All of the AND gates AND1, AND2, AND3, AND4, AND5 have two inputs and one output.

The AND gate AND1 is presented with the bit stream DATA1 and a permanent logic 1. The AND gate AND2 is presented with the bit stream DATA2 and a permanent logic 1. The output of AND gate AND1 is connected to one input of AND gate AND3, to one input of AND gate AND5, and, through inverter INV2, to one input of AND gate AND4. The output of AND gate AND2 is connected to the other input of AND gate AND4, to the other input of AND gate AND5, and, through inverter INV1, to the other input of AND gate AND3.

The outputs of the AND gates AND3, AND4, AND5 thus deliver the logic values 000, 100, 010, 001 when the bit streams DATA1, DATA2 have the bit combinations 00, 10, 01, 11, so that signal waveforms are obtained which correspond to those of FIG. 2(c) or, if the clock signal is additionally taken into account, to those of FIG. 4(d) except for the amplitude.

Figure 7:
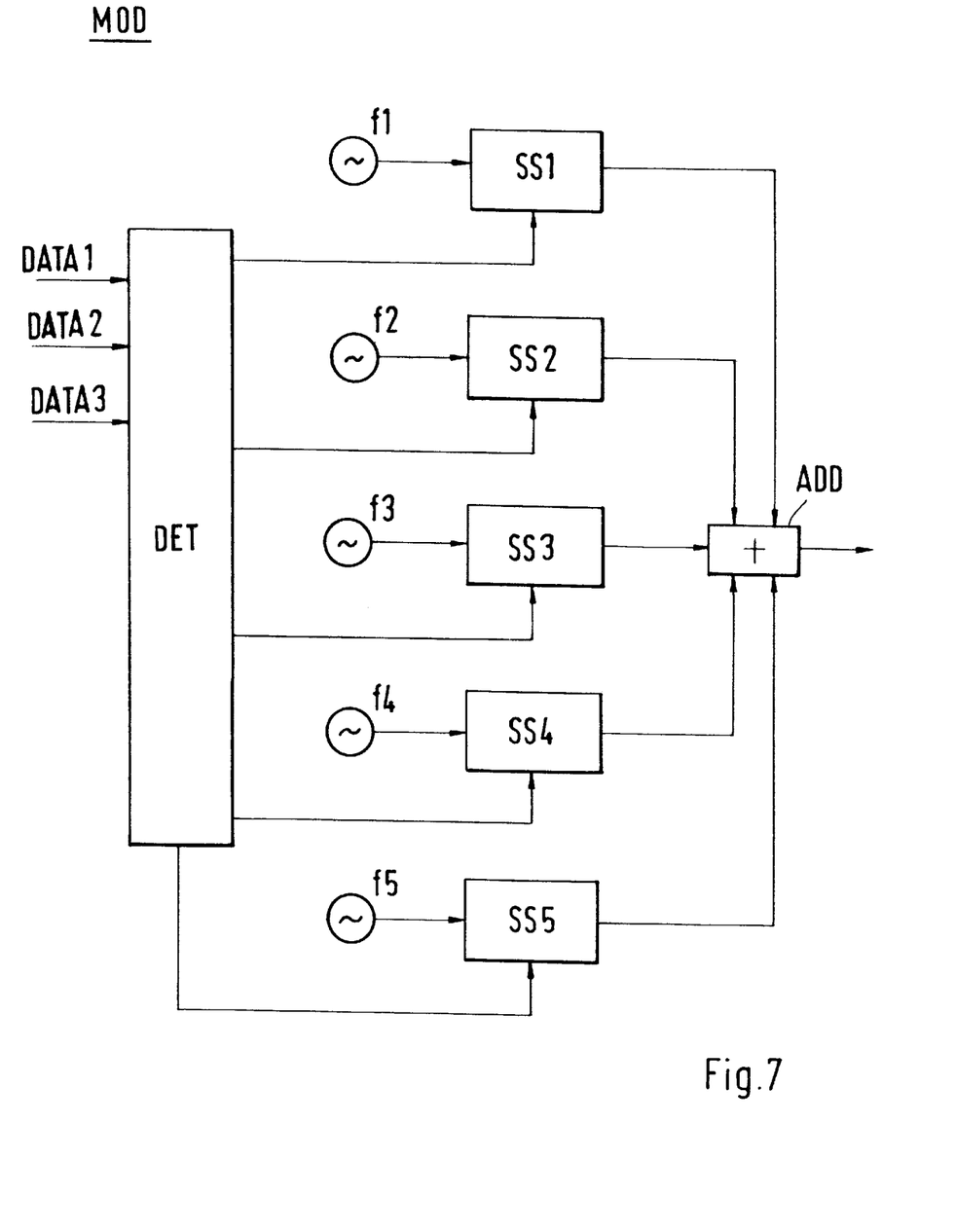
FIG. 7 is a schematic diagram of a fourth modulator according to the invention.

In the following, the fourth embodiment will be explained with the aid of FIG. 7. FIG. 7 shows a modulator MOD for modulating digital signals which consist of three bit streams DATA1, DATA2, DATA3 applied in parallel. Elements of the modulator MOD of FIG. 7 which are designated by the same reference characters as elements of FIG. 1 are similar in construction and have similar functions.

The modulator MOD includes a detection unit DET which detects the binary values of the three bit streams DATA1, DATA2, DATA3 and combines them into control signals for the means SS1, SS2, SS3. Means SS3 is identical in construction to means SS1.

With three bit streams DATA1, DATA2, DATA3, eight bit combinations are possible: 000, 001, 010, 011, 100, 101, 110, 111 if the logic values 0 or 1 can be assumed for each bit stream DATA1, DATA2, DATA3. The function of the detection unit DET is to find an assignment of these bit combinations to carrier frequencies.

A first possibility is to assign the three bit streams DATA1, DATA2, DATA3 to three different carrier frequencies f1, f2, f3. In three cases, identical carrier frequencies result, namely for the bit combinations 010, 101, and 111 In each of these cases, the resulting carrier frequency will be f2 if the three carrier frequencies f1, f2, f3 are spaced equal distances apart. A distinguishing feature during demodulation is then the resulting carrier frequency in connection with the received amplitude. For the case 010, the amplitude is 1; for the case 110, the amplitude is 2; and for the case 111, the amplitude is 3, so that at the receiver end, the transmitted bit combination can be demodulated by combining the receiving carrier frequency with the received amplitude.

A second possibility is to assign the three bit streams DATA1, DATA2, DATA3 to five different carrier frequencies f1, f2, f3, f4, f5.

The carrier frequencies f4 and f5 are generated by frequency generators and are applied to means SS4 and SS5, respectively, which are controlled by the detection unit DET. By the use of five carrier frequencies f1, f2, f3, f4, f5, the amplitude of the sum signal at the output of the adding unit can be limited, for example with an amplitude limiter, to a predetermined level and adapted, with a subsequent amplifier, to the optimum amplitude for obtaining an optimum signal-to-noise ratio on the transmission path. This will be illustrated by the following numerical example.

For the three bit streams DATA1, DATA2, DATA3, there are eight possible bit combinations, see above. If the carrier frequency f1 is assigned to the bit stream DATA1, the carrier frequency f2 to the bit stream DATA2, and the carrier frequency f3 to the bit stream DATA3, the following carrier frequencies will result: the carrier frequency 0 for the bit combination 000, the carrier frequency f1 for 001, f2 for 010, (f1+f2)/2 for 011, f3 for 100, (f1+f3)/2 for 101, (f2+f3)/2 for 110, and (f1+f2+f3)/2 for 111.

If the individual carrier frequencies are spaced at equal intervals, then f2=(f1+f3)/2=(f1+f2+f3)/2.

For the bit combinations 101 and 111, the assignment may be different, for example f4 for 101 and f5 for 111. This permits a simplified demodulation at the receiving end, since only the resulting carrier frequency needs to be detected, irrespective of the amplitude.

If the values of the carrier frequencies are f1=1000.05 Hz, f2=1000.10 Hz, f3=1000.15 Hz, f4=1000.175 Hz, and f5=1000.20 Hz, the following carrier frequency values result for the bit combinations: 0 for 000, 1000.05 Hz for 001, 1000.10 Hz for 010, 1000.075 Hz for 011, 1000.15 Hz for 100, 1000.175 Hz for 101, 1000.125 Hz for 110, and 1000.20 Hz for 111.

The resolution between two resulting carrier frequency values is at least 25 Hz, which is detectable at the receiving end with sufficient accuracy.

A third possibility is to assign the three bit streams DATA1, DATA2, DATA3 to three different carrier frequencies f1, f2, f3 whose values are chosen so that their different combinations will not result in equal frequency values. This can be achieved by frequency values which are not equidistant. Thus, the carrier frequency values resulting from the different bit combinations 010, 101, 111, namely the values f2, (f1+f3)/2, (f1+f2+f3)/2, would not be equal. This eliminates the need for the frequency generators for generating the carrier frequencies f4 and f5, and for the means SS4 and SS5. However, care must be taken to ensure that the resolution between all resulting carrier frequencies is sufficiently high that it can be detected at the receiving end. Which of the three possibilities will be preferred will depend on the parameters in each individual case, for example on the question of cost.

Figure 8:
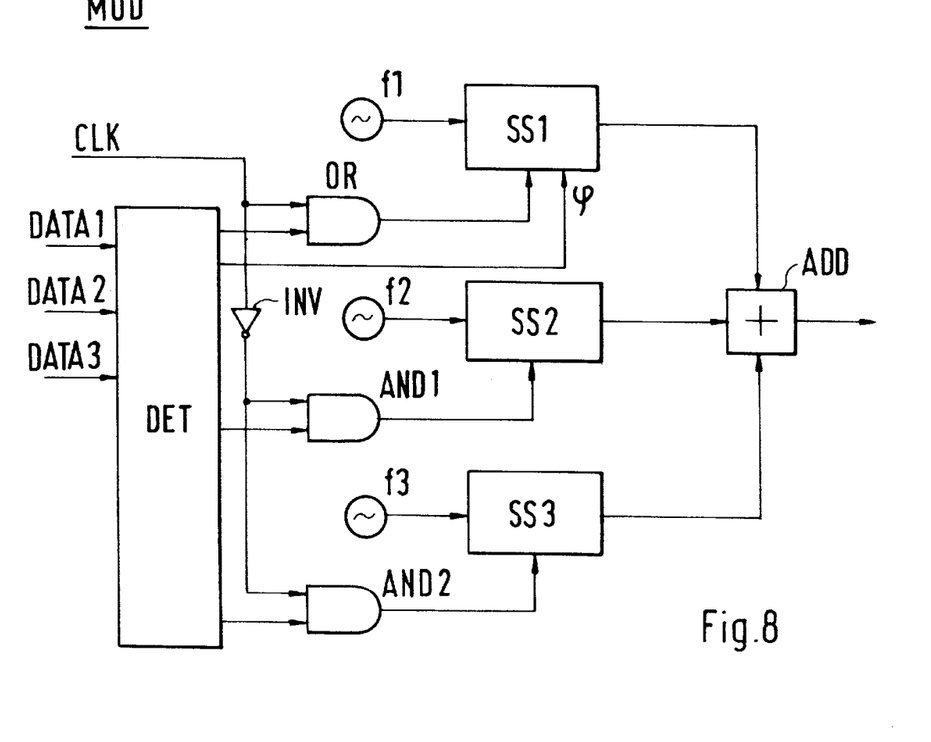
FIG. 8 is a schematic diagram of a fifth modulator according to the invention.

In the following, the fifth embodiment will be explained with the aid of FIG. 8. FIG. 8 shows a modulator MOD for modulating digital signals which consist of three bit streams DATA1, DATA2, DATA3 applied in parallel. Elements of the modulator MOD which are designated by similar reference characters as elements of FIG. 1 are similar in construction and have similar functions.

With three bit streams DATA1, DATA2, DATA3, eight bit combinations are possible: 000, 001, 010, 011, 100, 101, 110, 111, if the logical values 0 or 1 can be assumed for each bit stream DATA1, DATA2, DATA3. The function of the detection unit DET is to find an assignment of these bit combinations to carrier frequencies.

One possibility is to assign three different carrier frequencies f1, f2, f3 to the three bit streams DATA1, DATA2, DATA3. In three cases, namely for the bit combinations 010, 101, and 111, carrier frequencies result which are identical. In each of these cases, the resulting carrier frequency is f2 if the three carrier frequencies f1, f2, f3 are separated by equal distances. A distinguishing feature during demodulation is then the resulting carrier frequency in connection with the received amplitude. For the case 010, the amplitude is 1; for the case 101, the amplitude is 2; and for the case 111, the amplitude is 3, so that at the receiver end, the transmitted bit combination can be demodulated by combining the received carrier frequency with the received amplitude. Instead of transmitting different amplitudes, which may adversely affect the signal-to-noise ratio on the transmission path, the information on the different bit combinations 010, 101, 111 may be transmitted by means of the carrier frequency f2 in connection with the transmission of an angle setting.

In a manner similar to that explained in connection with FIG. 3, a clock signal is inserted into the output signal of the adding unit ADD by means of a matching circuit. The matching circuit of the modulator of FIG. 8 contains an OR gate OR, an inverter INV, and two AND gates AND1, AND2. One input of the OR gate OR and one input of each of the AND gates AND1, AND2 are fed with the respective control signals generated in the detection unit DET. The other input of the OR gate OR is fed with the clock signal, and the other inputs of the AND gates AND1, AND2 with the inverted clock signal. The output of the adding unit ADD thus provides a signal comparable to the fourth waveform of FIG. 4, i.e., a signal containing a synchronizing signal with the carrier frequency f1. By application of an additional control signal relating to the angle setting $\phi$, the synchronizing signal is not always transmitted with a phase of 0 degrees, but with defined phases which are assigned to the bit combinations. For example, phases of 0, 90, 180 degrees are assigned to the bit combinations 010, 101, 111. Thus, if the bit combination 101 occurs, in addition to the carrier frequency f2, the subsequent synchronizing signal with the carrier frequency f1 will be transmitted with the initial phase of 90 degrees. The nonzero phase is detected at the receiving end and can thus be assigned to the bit combination 101.

The detection unit DET at the transmitting end and the detection unit required at the receiving end can be implemented with hard-wired logic, as in FIG. 6, or in software.

The above embodiments relate to a modulator for modulating a digital signal which consists of two or three bit streams applied in parallel. It is readily possible to construct a modulator for a digital signal which consists of more than three bit streams applied in parallel. It is also possible to combine the teachings of different embodiments. The number of bit streams applied in parallel is limited by the bandwidth of the transmission channel and by the minimum required resolution between two carrier frequencies. A factor of at least 500 between the spacing of two carrier frequencies and the absolute value of a carrier frequency appears appropriate. One may also speak of a spectrum modulation, since instead of a single carrier frequency, a spectrum of carrier frequencies is used in a transmission channel of predetermined bandwidth.

Figure 9:
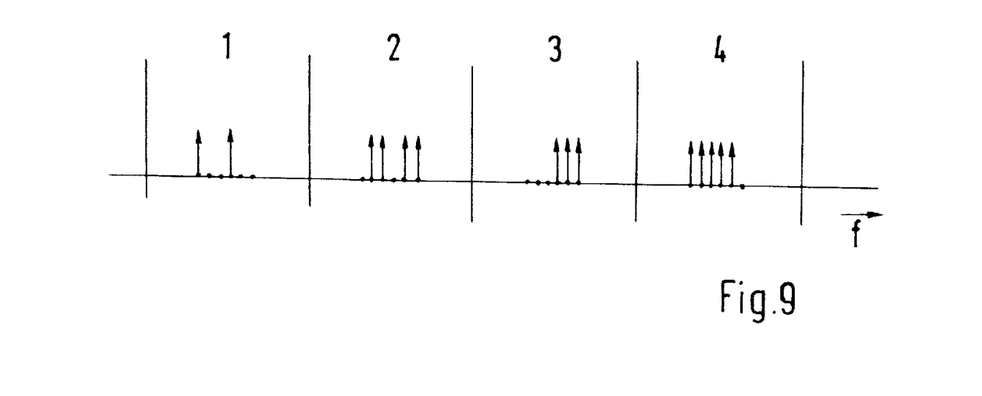
FIG. 9 shows a frequency spectrum of a multicarrier modulation.

FIG. 9 shows a frequency spectrum of a multicarrier modulation. The frequency spectrum shows four subchannels 1, 2, 3, 4 with six possible carrier frequencies each. The invention can also be applied to a multicarrier method using more subchannels. In each subchannel, spectrum modulation can be used to increase the transmission capacity. To do this, the carrier frequency of a subchannel is divided into a frequency spectrum consisting of several carrier frequencies. Then, an additional modulation is carried out by means of, for example, a modulator as shown in FIG. 1, 3, 5, 7, or 8.

Figure 10:
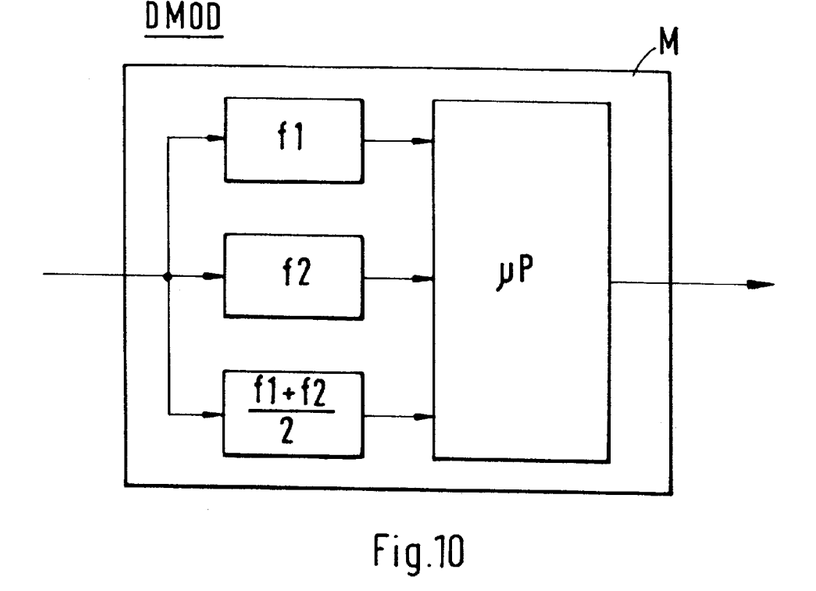
FIG. 10 is a schematic diagram of a first demodulator according to the invention.

FIG. 10 shows a first demodulator according to the invention in a schematic diagram. The demodulator DMOD demodulates the signal transmitted by the modulator of FIG. 1. It contains a means M which is suited for detecting three carrier frequencies f1, f2, (f1+f2)/2 in a transmission channel of predetermined bandwidth. The means M includes three frequency filters which transmit a logic 1 to an arithmetic unit $\mu P$, e.g., a microprocessor, when the corresponding carrier frequency occurs in the received signal. Depending on the result of the detection—for example, the carrier frequency f1 was detected in the first time slot—and on the number of possible carrier frequencies—here: three—, the arithmetic unit $\mu P$ generates a bit combination which corresponds to the bit combination that resulted in the assignment to the detected carrier frequency at the transmitting end. The carrier frequency f1 is synonymous with the bit combination 01, so that this combination will be generated by the arithmetic unit $\mu P$. The arithmetic unit $\mu P$ may be programmed in such a way that the assignment of the bit combinations to the carrier frequencies at the transmitting end is stored in a table and that, by comparing the detected carrier frequencies with the table, the arithmetic unit $\mu P$ can infer the bit combinations. The table can also be implemented with a hard-wired circuit constructed from, e.g., AND gates, OR gates, and inverters. In the arithmetic unit $\mu P$, several bit combinations generated successively in time are combined into at least one bit stream. If, for example, the bit combinations 01, 01, 11, 00, 10 are generated, they can be combined into two bit streams, e.g., 00101 and 11100, by demultiplexing at double frequency. This is necessary if the bit streams DATA1 and DATA2 originate from two different sources at the transmitting end.

Figure 11:
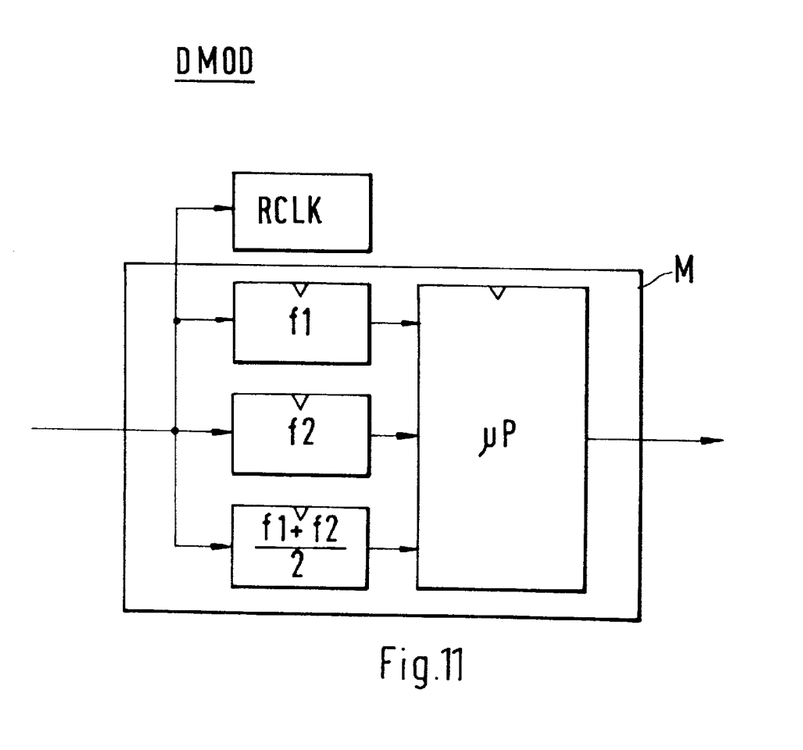
FIG. 11 is a schematic diagram of a second demodulator according to the invention.

FIG. 11 is a schematic diagram of a second demodulator according to the invention. The demodulator DMOD demodulates the signal transmitted by the modulator of FIG. 3. Elements designated by similar reference characters in FIGS. 11 and 10 are similar in construction and have similar functions. FIG. 11 additionally includes a clock recovery circuit RCLK for deriving from the synchronizing signal, i.e., the carrier frequency f1, which is transmitted at the frequency of the clock signal of FIG. 3, a clock signal by which the three frequency filters and the arithmetic unit $\mu P$ are controlled. The frequency filters will thus send a logic 1 to the arithmetic circuit $\mu P$ only if they have detected a carrier frequency and the clock signal is simultaneously at ZERO level. The arithmetic unit $\mu P$ can use the clock signal to perform the comparison with the table and/or the division into two bit streams.

Figure 12:
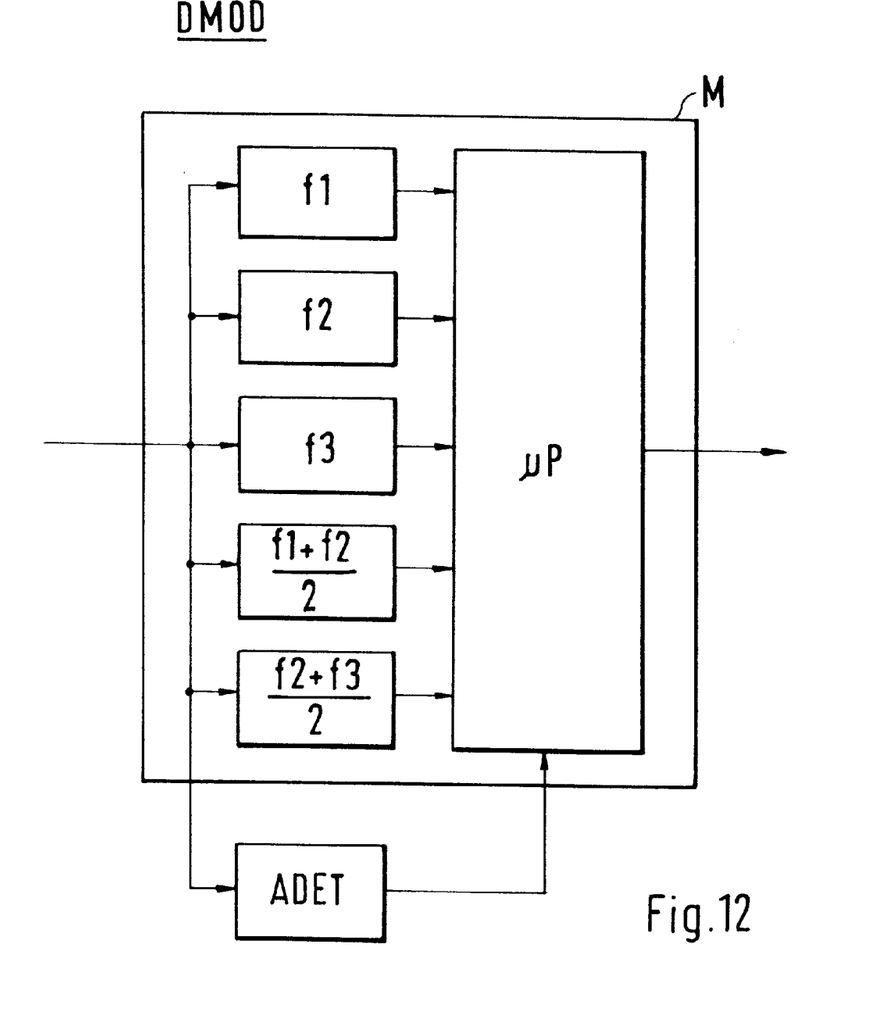
FIG. 12 is a schematic diagram of a third demodulator according to the invention.

FIG. 12 is a schematic diagram of a third demodulator according to the invention. The demodulator DMOD demodulates the signals transmitted by the modulator of FIG. 7. Elements designated by similar reference characters in FIGS. 12 and 10 are identical in construction and have similar functions. Two additional frequency filters are provided for detecting the carrier frequencies f3 and (f2+f3)/2. The arithmetic unit $\mu P$ performs the complementary function of the detection unit of FIG. 7.

For the first possibility from FIG. 7, an amplitude detector ADET is provided for detecting the amplitude of the received carrier frequency f2 and feeding the detected value to the means M. The means M is suited for generating a bit combination also in dependence of the detected value. If the detected amplitude is 1 and the detected carrier frequency is f2, the bit combination 010 will be generated; if the amplitude is 2 and the carrier frequency is f2, the bit combination 101 will be generated; and if the amplitude is 3 and the carrier frequency is f2, the bit combination 111 will be generated. At the receiver end, the transmitted bit combination can thus be demodulated by combining the received carrier frequency with the received amplitude.

For the second possibility from FIG. 7, two frequency filters for detecting the carrier frequencies f4 and f5 must be added instead of the amplitude detector ADET.

For the third possibility from FIG. 7, two frequency filters for detecting the carrier frequencies (f1+f3)/2 and (f1+f2+f3)/2 must be added instead of the amplitude detector ADET.

For the possibility explained with reference to FIG. 8, the amplitude detector ADET must be replaced with a clock recovery circuit comparable to that of FIG. 11, which detects the synchronizing signal and contains a phase detector for detecting the phase of the carrier frequency f1, and feeds the detected value to means M. The means M can then generate a bit combination also in dependence on the detected value by comparing the detected value with a phase value previously stored in the table.

One application for the spectrum modulation is ISDN channel multiplication on a subscriber line in an integrated services digital network (ISDN). In a basic access configuration, each terminal is assigned 144 kb/s for transmission. The 144 kb/s are divided into two 64-kb/s information-bearing channels, the socalled B channels, and a 16-kb/s signaling channel. The 144 kb/s suffice for the transmission of telephone messages, facsimile messages, etc., but will not suffice if the user wants to establish a high-quality video link, such as a video-telephone connection. By the use of a modem containing a modulator with an associated demodulator as described above, the transmission capacity on a B channel can be increased, so that even high-quality image transmission is possible. In each terminal, the data to be transmitted is modulated by spectrum modulation before being transmitted. Thus, 10 channels, for example, can be transmitted over the two B channels in a multiplex mode if each channel is designed for the simultaneous transmission of five carrier frequencies.

Another application for the spectrum modulation is in fixed narrow-band radio, such as shortwave radio, radio broadcasting, satellite systems, and fixed radiotelephone networks, such as DECT. In conventional transmitting equipment, the signals to be transmitted are additionally modulated with the spectrum modulation using a modulator as described above. In the receiving equipment, the received signals are demodulated in advance with a demodulator as described above. Existing radio channels can thus be retrofitted to achieve an improvement in performance.

A further application for the spectrum modulation is in narrow-band mobile radio. In a cellular mobile radio system, each cell has a base station. Each base station contains several modulators-demodulators as described above. Via a mobile station, each mobile user can request 4-, 8-, 16-, 64-, or 144-kb/s channels for the transmission of data, pictures, etc. at the base station serving the cell in which he or she is. Connections with a higher transmission capacity involve higher costs for the user but permit higher-quality communication and/or faster transmission. For the modulation and demodulation it suffices to specify at the beginning of the transmission the number of possible carrier frequencies and, if necessary, the mode of the additional transmission, for example by means of amplitude modulation or angle modulation. Thus, mobile stations can be sold in which the generation of two, three, four, etc. carrier frequencies is possible. This permits a graduation of the prices of different mobile stations. The base stations include suitable modems which contain modulators and demodulators as described above to offer the different transmission capacities.

A further application for the spectrum modulation is the low-cost increase in the transmission capacity of occupied channels which have spectral and/or temporal gaps. A transmission link (wire or radio link) is utilized insufficiently by, for example, an existing service. By the use of a modem with a modulator and a demodulator as described above, of a coupler for coupling in the additional signals at the transmitting end, and of a modem and a coupler for coupling out the additional signals at the receiving end, the capacity of the transmission channel can be increased. The couplers are time-division multiplexers and demultiplexers or diplexers, for example.

A further application for the spectrum modulation is in point-to-multipoint systems, such as broadband mobile radio between a base station controller and several base stations. From the base station controller, digital signals with 1000 carrier frequencies which were modulated with one of the above modulators are transmitted to the base stations. Each base station has a frequency filter, e.g., a bandpass filter, which transmits only the signals destined for the specific base station, i.e., the signals in the predefined frequency band, to a corresponding modulator and filters out all other carrier frequencies. The frequency filter of a base station is suitable for transmitting 50 carrier frequencies, for example. On an average, 30 carrier frequencies are used by the base station. The frequency filters of individual base stations overlap, so that under peak load conditions, 50 carrier frequencies can be assigned to a base station. A numerical example illustates this:

The synchronizing signal has a frequency of 2 GHz. Each base station has a separate filter for receiving the synchronizing signal. The first base station has a 2-GHz to 2.000050-GHz filter. The spacing of the carrier frequencies is 1 kHz. Thus, 50 carrier frequencies can be received by the first base station. The second base station has a 2.000031-GHz to 2.000080-GHz filter. The carrier frequencies are spaced by 1 kHz. Thus, 50 carrier frequencies can be received by the second base station. The first base station, as a rule, uses the 30 carrier frequencies from 2.000001 GHz to 2.000030 GHz; the second base station uses the 30 carrier frequencies from 2.000041 GHz to 2.000070 GHz. The 10 free carrier frequencies from 2.000031 GHz to 2.000040 GHz can be made available by the base station controller to either the first or second base station under peak load conditions. If the first base station needs more than 40 carrier frequencies, a reallocation will be carried out. The carrier frequencies from 2.000001 GHz to 2.000050 GHz will be allocated to the first base station, and the 30 carrier frequencies from 2.000051 GHz to 2.000080 GHz to the second base station. The same applies analogously for the other base stations. The frequency spacing to be detected is 500 Hz, a value which can be easily measured using simple means.

What is claimed is:

1. A modulator (MOD) for modulating a digital signal comprising a control unit (CTRL) adapted to assign the digital signal to be transmitted to a continuous wave analog carrier frequency (f1) in a transmission channel of predetermined bandwidth, characterized in that the digital signal comprises at least two separate digital signals, each comprising a different sequence of symbols, that the control unit (CTRL) is adapted to assign each separate digital signal to be transmitted to a corresponding distinct continuous wave analog carrier frequency (f2, f3, f4, f5) for modulation by the sequence of symbols of its corresponding digital signal, for providing corresponding distinct digitally modulated analog carriers, the digitally modulated analog carriers for combination with each other for transmittal in the transmission channel of predetermined bandwidth.

2. A modulator (MOD) as claimed in claim 1, characterized in that at least two frequency generators are provided for generating the analog carrier frequencies (f1, f2, f3, f4, f5), and that a distance between any two analog carrier frequencies is less than an absolute value of any one of the analog carrier frequencies (f1, f2, f3, f4, f5) by a factor of at least five hundred.

3. A modulator (MOD) as claimed in claim 2, characterized in that the control unit (CTRL) comprises at least two controllable means (SS1, SS2, SS3, SS4, SS5) for transmitting the analog carrier frequencies (f1, f2, f3, f4, f5) which are in phase at a start of oscillations, that the digital signal comprises plural bit streams (DATA1, DATA2, DATA3) in parallel, and that the at least two controllable means (SS1, SS2, SS3, SS4, SS5) are controlled in dependence on the bit streams (DATA1, DATA2, DATA3).

4. A modulator (MOD) as claimed in claim 3, characterized in that an adding unit (ADD) is provided for combining the carrier frequencies (f1, f2, f3, f4, f5) transmitted by the at least two controllable means (SS1, SS2, SS3, SS4, SS5).

5. A modulator (MOD) as claimed in claim 4, characterized in that the adding unit (ADD) is followed by an amplitude limiter (AMP) for limiting the amplitude of the combined carrier frequencies (f1, f2, f3, f4, f5) to a predetermined level.

6. A modulator (MOD) as claimed in claim 3, characterized in that a detection unit (DET) is provided for detecting binary values of the bit streams (DATA1, DATA2, DATA3) and combining them into control signals for the at least two controllable means (SS1, SS2, SS3, SS4, SS5).

7. A modulator (MOD) as claimed in claim 6, characterized in that a matching circuit (INV, OR, AND) is provided for combining the control of the at least two controllable means (SS1, SS2, SS3, SS4, SS5) with a clock signal (CLK) to achieve a transmission of a predetermined carrier frequency (f1) in dependence on the clock signal (CLK).

8. A modulator (MOD) as claimed in claim 7, characterized in that the detection unit (DET) is adapted to derive from the binary values of the bit streams (DATA1, DATA2, DATA3) an additional control signal for one of the at least two controllable means (SS1), said additional control signal serving to adjust the phase of the carrier frequency to be transmitted.

9. A modulator (MOD) as claimed in claim 6, characterized in that the detection unit (DET) is adapted to derive from the binary values the bit streams (DATA1, DATA2, DATA3) control signals for a number of the at least two controllable means (SS1, SS2, SS3, SS4, SS5) greater than the number of bit streams (DATA1, DATA2, DATA3).

10. A demodulator (DMOD) for demodulating digital signals combined together and received over a transmission channel of predetermined bandwidth, characterized in that there is provided at least one means (M) adapted to detect at least three analog carrier frequencies (f1, f2, (f1+f2)/2, f3, (f2+f3)/2, f4, f5) received by said demodulator each modulated with a separate digital signal, to generate a bit combination indicative of said separate digital signals in dependence on a result of a detection of a number of said at least three analog carrier frequencies, and to combine several bit combinations generated successively in time as a result of said number of carrier frequencies received by said demodulator differing over successive time periods of said digital signals into at least one bit stream (DATA1, DATA2, DATA3).

11. A demodulator (DMOD) as claimed in claim 10, characterized in that the means (M) is adapted to detect carrier frequencies (f1, f2, (f1+f2)/2, f3, (f2+f3)/2, f4, f5) whose spacing is less than an absolute value of any carrier frequency (f1, f2, (f1+f2)/2, f3, (f2+f3)/2, f4, f5) of said lat least three carrier frequencies by a factor of at least five hundred.

12. A demodulator (DMOD) as claimed in claim 10, characterized in that a phase detector is provided for detecting a phase of a carrier frequency (f1) and feeding a detected value of the phase to the means (M), and that the means (M) is adapted to generate a bit combination also in dependence on the detected value.

13. A demodulator (DMOD) as claimed in claim 10, characterized in that an amplitude detector (ADET) is provided for detecting an amplitude of received carrier frequencies (f1, f2, (f1+f2)/2, f3, (f2+f3)/2, f4, f5) and feeding a detected value to the means (M), and that the means (M) is adapted to generate a bit combination in dependence on the detected value.

14. A modulator (MOD) as claimed in claim 1, characterized in that the control unit (CTRL) comprises at least two controllable means (SS1, SS2, SS3, SS4, SS5) for transmitting the carrier frequency (f1) and the at least one further carrier frequency (f2, f3, f4, f5) which are in phase at a start of oscillations, that the digital signal comprises plural bit streams (DATA1, DATA2, DATA3) in parallel, and that the at least two controllable means (SS1, SS2, SS3, SS4, SS5) are controlled in dependence on the bit streams (DATA1, DATA2, DATA3).

15. A modulator (MOD) as claimed in claim 14, characterized in that an adding unit (ADD) is provided for combining the carrier frequency (f1) and the at least one further carrier frquency (f2, f3, f4, f5) transmitted by the at least two controllable means (SS1, SS2, SS3, SS4, SS5).

16. A modulator (MOD) as claimed in claim 15, characterized in that the adding unit (ADD) is followed by an amplitude limiter (AMP) for limiting the amplitude of the combined carrier frequencies (f1, f2, f3, f4, f5) to a predetermined level.

17. A modulator (MOD) as claimed in claim 14, characterized in that a detection unit (DET) is provided for detecting binary values of the bit streams (DATA1, DATA2, DATA3) and combining them into control signals for the at least two controllable means (SS1, SS2, SS3, SS4, SS5).

18. A modulator (MOD) as claimed in claim 3, characterized in that a matching circuit (INV, OR, AND) is provided for combining the control of the at least two controllable means (SS1, SS2, SS3, SS4, SS5) with a clock signal (CLK) to achieve a transmission of a predetermined carrier frequency (f1) in dependence on the clock signal (CLK).

19. A modulator (MOD) as claimed in claim 14, characterized in that the detection unit (DET) is adapted to derive from the binary values the bit streams (DATA1, DATA2, DATA3) control signals for a number of the at least two controllable means (SS1, SS2, SS3, SS4, SS5) greater than the number of bit streams (DATA1, DATA2, DATA3).

20. A modulator (MOD) as claimed in claim 18, characterized in that the detection unit (DET) is adapted to derive from the binary values of the bit streams (DATA1, DATA2, DATA3) an additional control signal for one of the at least two controllable means (SS1), said additional control signal serving to adjust the phase of the carrier frequency to be transmitted.

* * * * *